July 27, 1926.

J. F. FOX

HOLLOW AXLE WHEEL

Filed Sept. 22, 1921

1,593,969

Inventor
John F. Fox
By Allen & Allen
Attys.

Patented July 27, 1926.

1,593,969

UNITED STATES PATENT OFFICE.

JOHN F. FOX, OF ST. LOUIS, MISSOURI, ASSIGNOR TO SOUTHERN WHEEL COMPANY, OF ST. LOUIS, MISSOURI, A CORPORATION OF GEORGIA.

HOLLOW-AXLE WHEEL.

Application filed September 22, 1921. Serial No. 502,321.

My invention relates to that type of axle trucks in which a hollow axle is employed to hold grease which is supplied to an annular groove in the wheel bearing through holes in the axle, and the annular groove is also enlarged to serve as a supplemental reservoir for the grease fed from the hollow axle.

The object of the invention is to provide bushings for the wheels without interfering with the feeding of the grease and to furnish a construction in which the bushing shall be expanded in place, so that it becomes permanently secured without any liability of becoming loose or dislodged.

In the drawings:—

Figure 2:
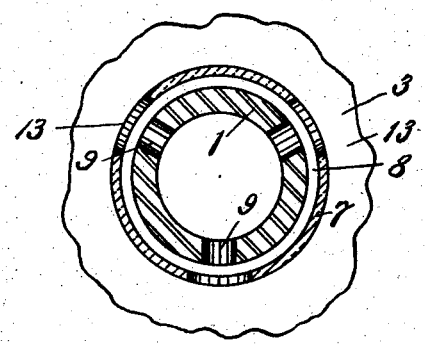
Figure 2 is a cross section on the lines 2—2 of Figure 1.
Figure 1:
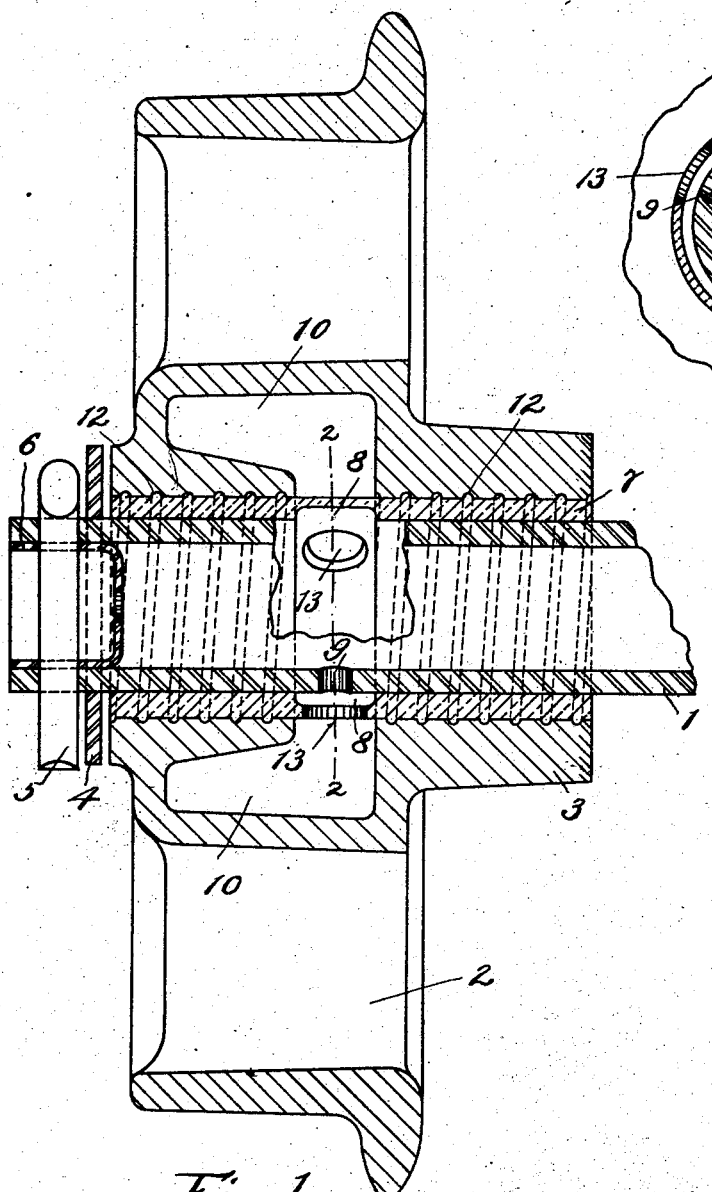
Figure 1 is a central, vertical section of one of the truck wheels and the outer end of a hollow axle.

I have only illustrated a portion of the axle of a truck as my invention can be applied to any of the well known constructions of trucks.

The wheel 2 with hub 3 is mounted to rotate on the fixed axle 1 and held in position by the washer 4 and cotter pin 5. To hold the grease in the hollow axle, a steel cup 6 is preferably employed which is also held in place by the cotter pin 5. A bushing 7, preferably of bronze, is provided for the wheel. This bushing is formed with an annular groove 8 and in line with this groove a plurality of holes 9, preferably three, are formed through the axle, the diameter of the holes in the axle being somewhat less than the width of the groove. Holes 13 are also provided at the base of the groove opening into the annular space 10 in the hub of the wheel.

In order to hold the bushings in the wheels, a spiral groove 12 is formed in the hub and a bushing, of the diameter of the hub, and provided with the groove and holes, as described, is slipped into the hub and the bushing is then expanded until the metal of the bushing is forced into the spiral groove. This is accomplished by driving into the bushing a plurality of steel balls, the first of which is, say, a hundredth of an inch greater in diameter than the bushing. This is followed by another ball of slightly greater diameter. This expands the bushing into the spiral groove in the hub and permanently locks it in place and at the same time the internal diameter of the bushing, originally the same as the axle, is increased so that the wheel lined with the permanent bushing will slip easily over the axle. The diameter of the holes 9 in the axle being less than the width of the groove, and the wheels having some play between the washers 4 and the inner thrust bearing of the wheel, the grease is drawn by the longitudinal play of the wheels into the annular groove and thence distributed to the bearing. Any surplus of grease is received in the cavity in the hub and ultimately finds its way through the holes 13 into the bearings.

Having thus described my invention, what I claim as new and desire to secure by Letters Patent, is:—

1. The combination with a hollow axle for the holding of grease, of a wheel loosely mounted thereon and having slight longitudinal play, with a separate bushing for the wheel of different metal from the wheel hub, and means for locking the bushing in the hub of the wheel, the bushing provided with an annular groove on the inside and with openings into said groove from the hollow axle, of less diameter than the width of the groove, for the distribution of the grease to the bearing.

2. The combination with a hollow axle for the holding of grease, of a wheel loosely mounted thereon and having slight longitudinal play, with a separate bushing for the wheel of different metal from the wheel hub, and means for locking the bushing in the hub of the wheel, comprising a spiral groove in the hub of the wheel in which the bushing has been expanded, the bushing provided with an annular groove, and with openings into said groove from the hollow axle, of less diameter than the width of the groove, for the distribution of the grease to the bearing.

3. The combination with a hollow axle for the holding of grease, of a wheel loosely mounted thereon and having slight longitudinal play, with a separate bushing for the wheel of different metal from the wheel hub, and means for locking the bushing in the hub of the wheel, the bushing provided with an annular groove on the inside and with openings into said groove from the inside of the hollow axle, of less diameter than the width of the groove, for the distribution of the grease to the bearing, with the wheel hub provided with a cavity with openings thereinto leading to the openings in the bushing.

JOHN F. FOX.